United States Patent
Poyarekar

(10) Patent No.: US 9,256,468 B2
(45) Date of Patent: Feb. 9, 2016

(54) DYNAMIC INCREMENTAL MEMORY ALLOCATION ON PROGRAM STACK

(75) Inventor: Siddhesh Poyarekar, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 779 days.

(21) Appl. No.: 12/862,646

(22) Filed: Aug. 24, 2010

(65) Prior Publication Data
US 2012/0054463 A1    Mar. 1, 2012

(51) Int. Cl.
G06F 9/50    (2006.01)
G06F 12/02    (2006.01)
G06F 9/455    (2006.01)

(52) U.S. Cl.
CPC ............ *G06F 9/5016* (2013.01); *G06F 12/023* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 4,524,416 A * | 6/1985 | Stanley et al. | ................ | 711/200 |
| 4,951,194 A * | 8/1990 | Bradley et al. | ................ | 711/132 |
| 5,835,958 A * | 11/1998 | Long et al. | ................... | 711/170 |
| 6,006,323 A * | 12/1999 | Ma et al. | ....................... | 712/202 |
| 6,240,498 B1 * | 5/2001 | Dickes et al. | ................ | 711/170 |
| 6,336,167 B1 * | 1/2002 | Jeffries et al. | ................ | 711/132 |
| 6,643,662 B1 * | 11/2003 | Farago et al. | | |
| 7,949,848 B2 * | 5/2011 | Wilkinson | ..................... | 711/171 |
| 2004/0019744 A1 * | 1/2004 | Boucher | ........................ | 711/132 |
| 2006/0277543 A1 * | 12/2006 | Sokolov et al. | ................... | 718/1 |
| 2007/0038810 A1 * | 2/2007 | Rosen et al. | .................... | 711/132 |

OTHER PUBLICATIONS

"Linux/Unix Command: alloca", accessed at: http://linux.about.com/library/cmd/blcmdl3_allcoa.htm on Jul. 14, 2010, 2 pages.
Narayan, Ram, "Linux assemblers: A comparison of GAS and NASM", acessed at: http://www.ibm.com/developerworks/linux/library/l-gas-nasm.html on Jul. 14, 2010, last updated Oct. 17, 2007, 14 pages.
"Assembly language", accessed at: http://en.wikipedia.org/wiki/Assembly_language on Jul. 12, 2010, last updated Jul. 12, 2010, 14 pages.
Siddhesh, "Hacking on assembly code: Dynamic memory allocation on stack?", accessed at: http://siddhesh.livejournal.com/24212.html on Jun. 29, 2010, last updated Jun. 26, 2010, 6 pages.
Bartlett, Jonathan, "Programming from the Ground Up", 2003, 326 pages.

* cited by examiner

*Primary Examiner* — Edward Dudek, Jr.
*Assistant Examiner* — Ralph A Verderamo, III
(74) *Attorney, Agent, or Firm* — Lowenstein Sandler LLP

(57) ABSTRACT

Some embodiments of a system and a method to dynamically allocate memory on program stack are presented. A memory allocator executable on a processing device may create a data structure on a stack to hold data for a program running on the processing device. The memory allocator can dynamically change the size of the data structure on the stack in response to data need of the program while the program is running.

15 Claims, 4 Drawing Sheets

DYNAMIC INCREMENTAL MEMORY ALLOCATION ON PROGRAM STACK

TECHNICAL FIELD

Embodiments of the present invention relate to programming, and more specifically to memory allocation in programming.

BACKGROUND

In general, each conventional computer typically supports a particular type of assembly language, which is associated with the specific architecture of a processor or processing device within the computer. An assembly language is a low level programming language that provides a symbolic representation of machine-executable instructions or object code. A utility program commonly referred to as an assembler can translate instructions written in an assembly language into object code executable by the processor. Although many assembly languages are not as easy to program as some high-level programming languages (such as C, C++, etc.), there are some advantages in programming with assembly languages over high-level programming languages. For instance, programs written in assembly languages are generally smaller in size, with lower overhead, and can be executed in greater speed.

In some common Unix-based systems, a library function, alloca( ), is provided to allocate memory. However, alloca( ) in general can allocate memory on a stack for a variable only once. The function returns a pointer to the beginning of the allocated space. If the allocation causes stack overflow, program behavior could be undefined. Note that alloca( ) is based on a calculated fixed size. In other words, the size of memory on the stack has to be predetermined with alloca( ). As a result, conventional memory allocation using alloca( ) lacks flexibility and can be seriously inefficient.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method, an apparatus, and a system to dynamically allocate memory on a program stack. In some embodiments, a memory allocator executable on a processing device may create a data structure on a stack to hold data for a program running on the processing device. The memory allocator can dynamically change the size of the data structure on the stack in response to data need of the program while the program is running. Such technique is particularly useful for fast processing of data stream, such as in streaming video, because of its flexibility in memory allocation. Details of some embodiments of how to dynamically allocate memory on a program stack are further described below.

Figure 1:
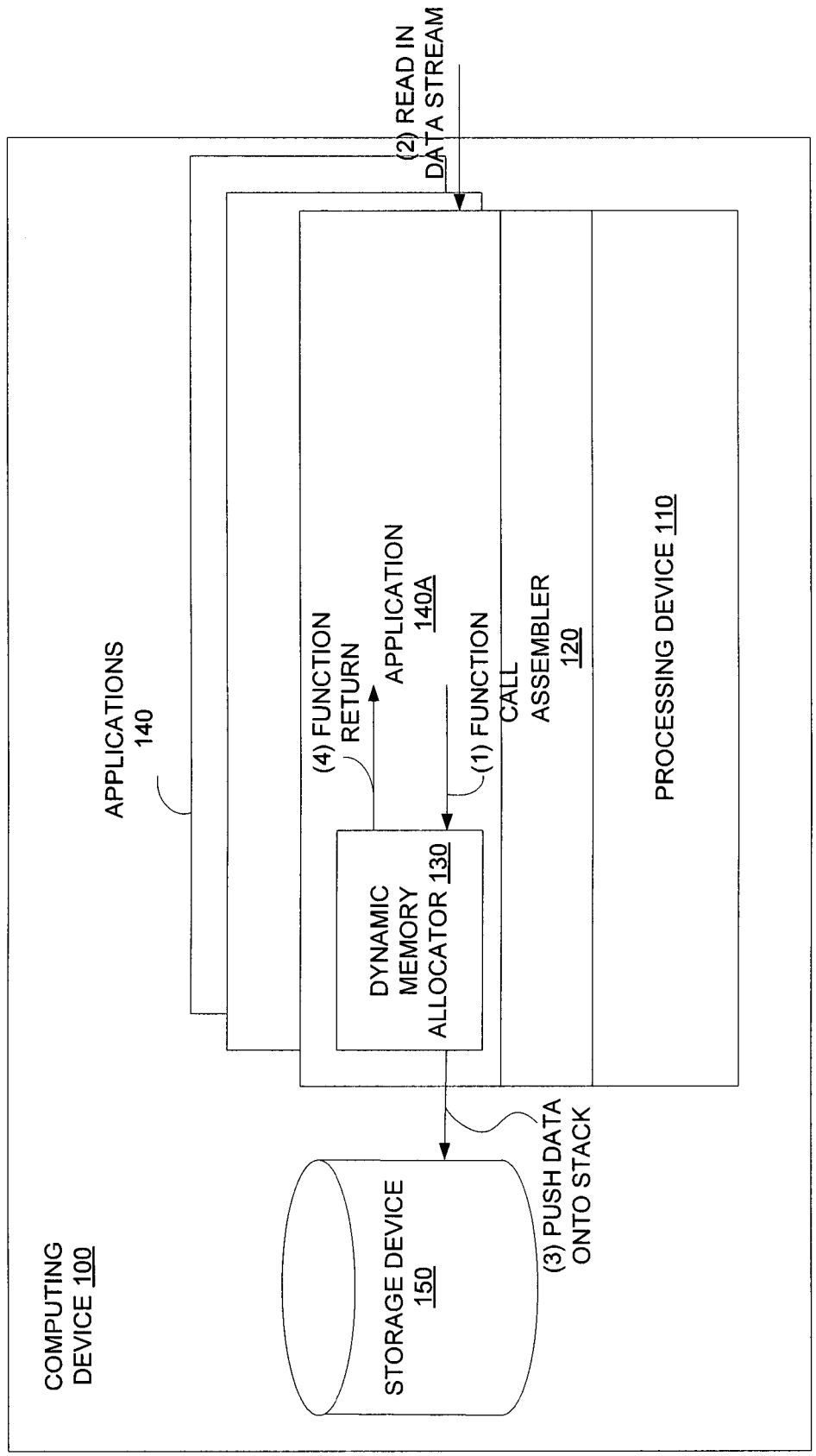
FIG. 1 illustrates one embodiment of a computing device usable in some embodiments of the invention.

FIG. 1 illustrates one embodiment of a computing device usable in some embodiments of the invention. The computing device 100 may be a personal desktop computer, a server, a laptop computer, a tablet computer, a personal digital assistant (PDA), a smart phone, a digital camera, a portable media viewing device (e.g., an electronic book viewer), a video game console, a printer, etc. The computing device 100 includes at least a processing device 110 and a storage device 150.

The processing device 110 represents one or more general-purpose processing devices, such as a microprocessing device, a central processing unit, or the like. More particularly, the processing device 110 may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. The processing device 110 may also be one or more special-purpose processing devices such as an application specific integrated circuit (ASIC), a field programmable gate array (FPGA), a digital signal processing device (DSP), network processing device, or the like. The processing device 110 is configured to execute a dynamic memory allocator 130 for performing the operations and steps discussed herein.

The storage device 150 includes one or more machine-readable storage media (a.k.a. computer-readable storage media) to store data and/or instructions. In some embodiments, the storage device 150 includes one or more of the following: flash memory, dynamic random access memory (DRAM) (such as synchronous DRAM (SDRAM)), a static memory (e.g., flash memory, static random access memory (SRAM), etc.

The computing device 100 may further include other hardware components not shown. For example, the computing device 100 may include a network interface device to communicably couple to a network (e.g., local area network (LAN), Ethernet, Internet, etc.). The computing device 100 also may include a video display unit (e.g., a liquid crystal display (LCD), a cathode ray tube (CRT), a touch screen, etc.), an input device (such as a touch screen, an alphanumeric input device (e.g., a keyboard), a cursor control device (e.g., a mouse, a joystick, etc.), etc.), and a signal generation device (e.g., a speaker).

In some embodiments, the processing device 110 is configured to execute an assembler 120. Broadly speaking, the assembler 120 translates assembly instructions into object code executable by the processing device 110. The assembler 120 can resolve symbolic names for memory locations and other entities to create object code. One or more programs written in an assembly language can be translated by the assembler 120. In some embodiments, a dynamic memory allocator 130 written in an assembly language and the assembler 120 translates the assembly code of the dynamic memory allocator 130 into machine-executable code.

In some embodiments, the dynamic memory allocator 130 provides a method for dynamically allocating memory incrementally for a data structure (e.g., an array, a list, etc.) local to a function, on a program stack stored in the storage device 150. For example, by making a call to the dynamic memory allocator 130 (1) within a function, application 140A can read a data stream from a data source (2), which can be a computer readable storage medium (e.g., an optical disk, a flash memory card, etc.) or an input device (e.g., a keyboard, a network interface, etc.), which can then be pushed into the data structure on the stack one element at a time (3), with a variable pointing to the bottom of the data structure, or with the bottom containing a special value marking its end. The top of the data structure can be evaluated from a stack pointer. Once the reading and evaluation of information from the data source is complete, the contents can be read out as a single array of data, from the top of the stack down to the bottom. Alternatively, the top of the array may be recorded and updated in a separate variable to make it independent of the stack pointer. Some exemplary embodiments of the data structure and the stack are discussed below with reference to FIGS. 2A-2B.

In some embodiments, the dynamic memory allocator 130 uses the push instruction from the processor instruction set in the common cases of pushing data of size two bytes or more, but not for single bytes or non-standard memory sizes (e.g., for structures, objects, etc.). When encountering single bytes or non-standard memory sizes, the method may use generic "mov" and "sub" or "dec" instructions to emulate the push instruction. For example, a digit can be read from a number, then a stack pointer is moved ahead to make room for a byte, followed by storing the American Standard Code for Information Interchange (ASCII) representation of that number into that byte. By emulating the push instruction as discussed above, a single byte value can be stored in just one byte of memory, unlike using an actual push instruction, which would cause the one byte of data to occupy at least two bytes of memory.

The allocated memory can be automatically freed when the current function returns (4) by unwinding the stack. The resultant arrays can be passed into functions for reading and writing, but they cannot be re-sized within those functions. The resultant arrays are also not available for returning to the calling routine, but this can be arranged by copying the contents into a heap allocated memory area.

In some embodiments, the applications 140 include network access applications (e.g., electronic mail applications, browsers, etc.), digital media viewing applications (e.g., video streaming applications), etc. The applications 140 can call the dynamic memory allocator 130 to have memory allocated such that the allocated memory size can be dynamically changed during runtime. As such, the applications 140, by using the dynamic memory allocator 130, can read in a data stream and store the data read into a data structure on the stack in the storage device 150 in a fast and efficient way.

Figure 2:
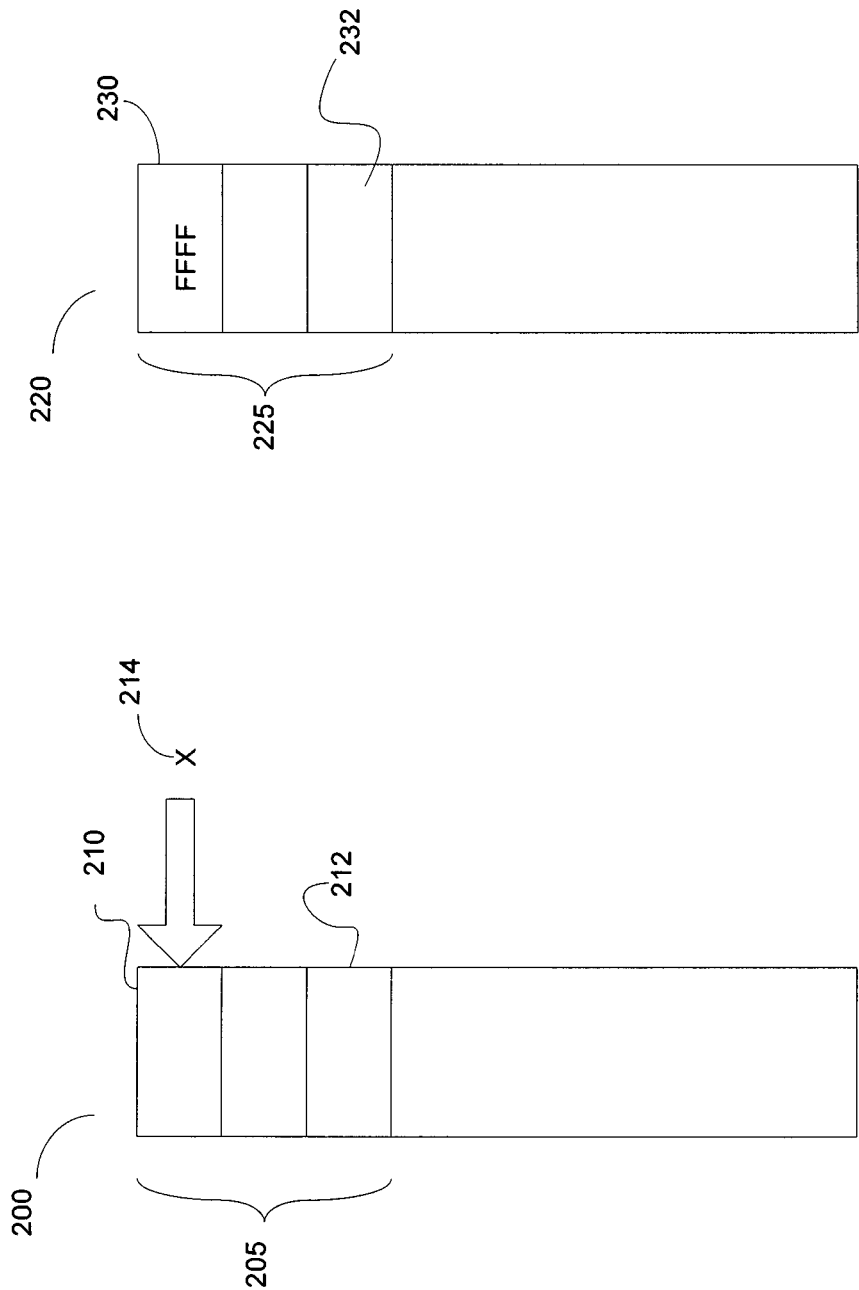
FIG. 2A shows one embodiment of a stack.
FIG. 2B shows an alternate embodiment of a stack.

FIG. 2A shows one embodiment of a stack according to some embodiments of the invention. The stack 200 can be stored in a computer-readable storage medium, such as the storage device 150 illustrated in FIG. 1. The stack is laid out in reverse, with the highest address (also known as the bottom of the stack) being shown at the top in FIG. 2A. The stack grows downwards, with lower addressed memory coming below the higher addresses in FIG. 2A, which is the opposite notation of the conventional memory. On the stack 200, a data structure 205, which is an array, has been defined. The end 210 of the array 205 is on the bottom of the stack 200. The variable 214 is used to point to the end of the array 205 on stack 200. If additional memory is needed, the beginning 212 of the array 205 can be moved further up the stack to increase the size of the array 205.

FIG. 2B shows an alternate embodiment of a stack according to some embodiments of the invention. Again, the stack 220 can be stored in a computer-readable storage medium, such as the storage device 150 illustrated in FIG. 1. On the stack 220, a data structure 225, which is an array, has been defined. The end 230 of the array 225 is at the bottom of the stack 220, where a special value "FFFF" is stored to mark it. If additional memory is needed, the beginning 232 of the array 230 can be moved up to higher location in the stack 220 to increase the size of the array 230 and vice versa.

Figure 3:
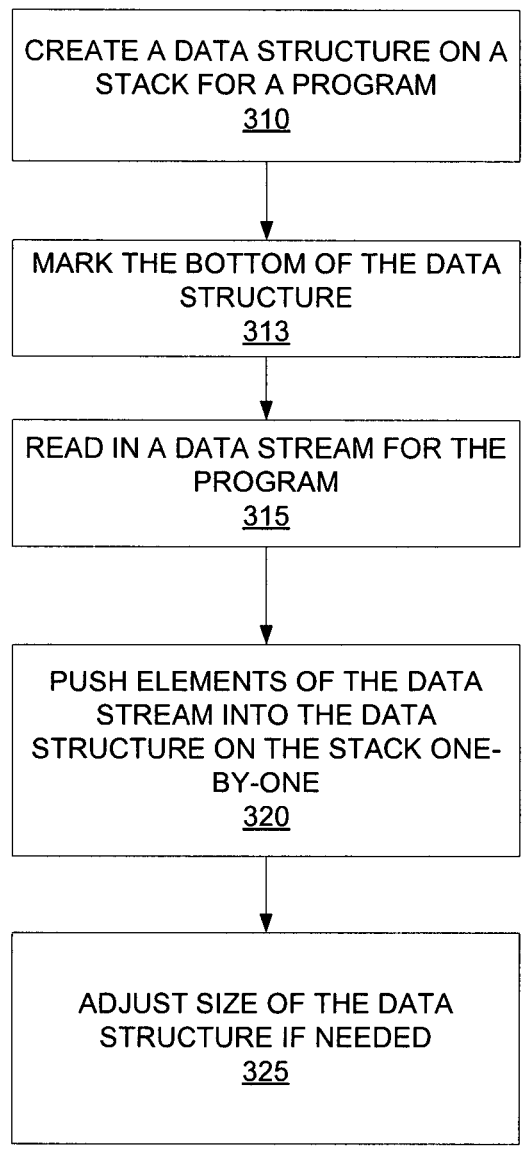
FIG. 3 shows a flowchart of one embodiment of a method to create a data structure on a stack and to dynamically change the size of the data structure.

FIG. 3 shows a flowchart of one embodiment of a method to create a data structure on a stack and to dynamically change the size of the data structure. The method may be performed by processing logic that may comprise hardware (e.g., circuitry, dedicated logic, programmable logic, microcode, etc.), software (such as instructions run on a processing device), firmware, or a combination thereof. For instance, the memory allocator 130 illustrated in FIG. 1 may perform at least part of the method in some embodiments.

In some embodiments, processing logic creates a data structure on a stack for a program (processing block 310). The data structure can be an array, a list, etc. Then processing logic marks the bottom of the data structure (processing block 313). For example, processing logic may store a special value at the bottom of the data structure, or use a variable to point to the bottom of the data structure. Next, processing logic reads in a data stream for the program (processing block 315). Processing logic pushes elements of the data stream into the data structure one-by-one (processing block 320). If needed, processing logic may adjust the size of the data structure to accommodate the data stream (processing block 325). For example, processing logic may move the special value marking the bottom of the data structure to a different location in the stack in order to adjust the size of the data structure.

Figure 4:
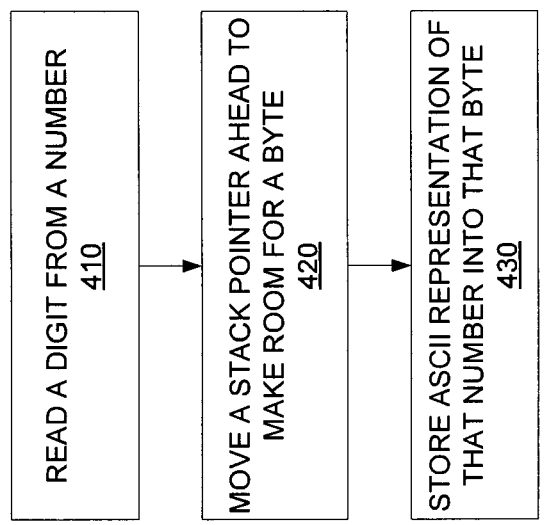
FIG. 4 illustrates a flowchart of one embodiment of a method to emulate a push instruction to accommodate data of a non-standard size.

FIG. 4 illustrates a flowchart of one embodiment of a method to emulate a push instruction to accommodate data of a non-standard size. The method may be performed by processing logic that may comprise hardware (e.g., circuitry, dedicated logic, programmable logic, microcode, etc.), software (such as instructions run on a processing device), firmware, or a combination thereof. For instance, the memory allocator 130 illustrated in FIG. 1 may perform at least part of the method in some embodiments.

Note that a data structure (e.g., an array) has already been created on a stack as discussed above with reference to FIG. 3. For data elements having a standard size (e.g., 2-byte), a push instruction supported by many assembly languages can be used to push the data elements into the stack. However, for data elements having a non-standard size (e.g., single byte data elements, specially defined objects, etc.), processing logic may perform the following operations to emulate the push instruction.

Initially, processing logic reads a digit from a number (processing block 410). Then processing logic moves a stack pointer ahead to make room for a byte (processing block 420). Finally, processing logic may store the ASCII representation of that number into that byte (processing block 430).

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "extracting" or "creating" or "assigning" or "determining" or "calibrating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including optical disks, CD-ROMs, and magnetic-optical disks, read-only memories (ROMs), random access memories (RAMS), EPROMs, EEPROMs, flash memories, magnetic or optical cards, or any type of media suitable for storing electronic instructions, where each may be coupled to a computer system bus or an input/output port (e.g., Universal Serial Bus (USB) input/output port).

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Thus, some embodiments of a system and a method to dynamically adjust memory allocation on program stack have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   creating, by a memory allocator executed by a processing device, a data structure on a stack to hold data for a program running on the processing device, wherein a special value stored in the data structure marks a bottom of the data structure, the bottom of the data structure having a higher physical memory address than a top of the data structure; and
   changing, by the memory allocator, a size of the data structure on the stack in response to a data need of the program while the program is running by incrementally moving the special value marking the bottom of the data structure up the stack to a higher physical memory location in the stack.

2. The method of claim 1, further comprising:
   pushing, by the memory allocator, one element of a data stream at a time into the data structure as the program reads in the data stream.

3. The method of claim 1, wherein a size of each element stored in the data structure is of a non-standard memory size.

4. The method of claim 1, wherein a size of each element stored in the data structure is of one byte.

5. The method of claim 1, further comprising:
   emulating, by the memory allocator, a push instruction using a plurality of generic instructions in an assembly language when a size of each element stored in the data structure is of a non-standard memory size.

6. An apparatus comprising:
   a storage device to store a stack; and
   a processing device, operatively coupled with the storage device, to execute a memory allocator, the memory allocator to create a data structure on the stack to hold data for a program running on the processing device, wherein a special value stored in the data structure marks a bottom of the data structure, the bottom of the data structure having a higher physical memory address than a top of the data structure, and to change a size of the data structure on the stack in response to data need of the program while the program is running by incrementally moving the special value marking the bottom of the data structure to a different location in the stack.

7. The apparatus of claim 6, wherein the memory allocator pushes one element of a data stream at a time into the data structure as the program reads in the data stream.

8. The apparatus of claim 6, wherein a size of each element stored in the data structure is of a non-standard memory size.

9. The apparatus of claim 6, wherein a size of each element stored in the data structure is of one byte.

10. The apparatus of claim 6, wherein the memory allocator emulates a push instruction using a plurality of generic instructions in an assembly language when a size of each element stored in the data structure is of a non-standard memory size.

11. A non-transitory computer-readable storage medium embodying instructions that, when executed by a processing device, will cause the processing device to:
    create, by the processing device, a data structure on a stack to hold data for a program running on the processing device, wherein a special value stored in the data structure marks a bottom of the data structure, the bottom of the data structure having a higher physical memory address than a top of the data structure; and
    change a size of the data structure on the stack in response to data need of the program while the program is running by incrementally moving the special value marking the bottom of the data structure to a different location in the stack.

12. The non-transitory computer-readable storage medium of claim 11, wherein the instructions cause the processing device further to:
    push one element of a data stream at a time into the data structure as the program reads in the data stream.

13. The non-transitory computer-readable storage medium of claim 11, wherein a size of each element stored in the data structure is of a non-standard memory size.

14. The non-transitory computer-readable storage medium of claim 11, wherein a size of each element stored in the data structure is of one byte.

15. The non-transitory computer-readable storage medium of claim 11, wherein the instructions cause the processing device further to:
  emulate a push instruction using a plurality of generic instructions in an assembly language when a size of each element stored in the data structure is of a non-standard memory size.

* * * * *